United States Patent [19]

Shervington et al.

[11] Patent Number: 5,166,569
[45] Date of Patent: Nov. 24, 1992

[54] ROTOR CONTAINMENT ASSEMBLY FOR DYNAMOELECTRIC MACHINES

[75] Inventors: Roger M. Shervington; Lee L. Thomas, both of Rockford; Mohd Aleem, Roscoe; David J. Turner, Rockford, all of Ill.

[73] Assignee: Sundstrand Corporation, Rockford, Ill.

[21] Appl. No.: 624,383

[22] Filed: Dec. 4, 1990

[51] Int. Cl.$^5$ .............................................. H02K 1/22
[52] U.S. Cl. ........................... 310/261; 310/42; 310/91; 310/214; 310/216
[58] Field of Search ............... 310/42, 270, 91, 261, 310/262, 263, 264, 265, 267, 216, 85, 198, 86, 208, 88, 195, 214; 29/598

[56] References Cited

U.S. PATENT DOCUMENTS

| | | | |
|---|---|---|---|
| 4,039,870 | 8/1977 | Sterrett | 310/42 |
| 4,332,079 | 6/1982 | Silver | 29/598 |
| 4,549,341 | 10/1985 | Kasabian | 310/42 |
| 4,598,218 | 7/1986 | Aleem | 310/42 |
| 4,614,888 | 9/1986 | Mosher | 310/270 |
| 4,647,804 | 3/1987 | Wefel | 310/261 |
| 4,933,583 | 6/1990 | Ripplinger | 310/261 |

Primary Examiner—R. Skudy
Attorney, Agent, or Firm—Antonelli, Terry, Stout & Kraus

[57] ABSTRACT

A rotor assembly including first and second generally discoidal endshafts disposed at opposite ends of the rotor assembly, an electromagnetic core and winding assembly secured between the endshafts, and a generally annular sleeve member shrunk-fit onto the end shafts in a position surrounding the electromagnetic core and winding assembly. The torque is transmitted through the sleeve member between the endshafts during operation of the dynamoelectric device in which the rotor is employed. A method of assembling the rotor is also disclosed in which the electromagnetic core and winding assembly is bolted between the endshafts. The sleeve member is heated to a temperature between 900° and 1,000° F, the sleeve member is brought into a position over the endshafts, and subsequently allow to cool to ambient temperature to shrink into locking engagement with the endshafts.

14 Claims, 3 Drawing Sheets

ROTOR CONTAINMENT ASSEMBLY FOR DYNAMOELECTRIC MACHINES

TECHNICAL FIELD

The present invention relates to rotor assemblies in dynamoelectric devices, and more particularly to rotor assemblies including a containment sleeve.

BACKGROUND OF THE INVENTION

Dynamoelectric devices such as generators are widely used in aircraft to generate electrical power required to operate the many systems on board the aircraft. Such dynamoelectric devices are naturally subjected to extreme environmental conditions. For example, in high performance aircraft, the generator is subject to ambient pressure altitudes from −1,000 to 80,000 feet, and to ambient temperatures from −65° to 700° F. In order to maintain proper conditions within such generators, it is frequently necessary to provide a sealed generator housing allowing for retention of a gas provided in the generator (i.e., nitrogen may be provided to keep the moisture out of the generator and to provide a positive pressure to enhance oil scavenge). Such a sealed housing is also necessary in order to allow for proper circulation of coolant and lubricant without leakage.

The generator housing encloses both a stator and rotor, and the rotor may include an electromagnetic core and winding assembly provided between two stub shafts or "endshafts". In a high speed, 24,000 R.P.M. generator arrangement a containment sleeve surrounding the electromagnetic core and winding assembly is usually secured at each end thereof to the respective endshafts by welding. The cylindrical metallic sleeve provides mechanical support for the core wedges and hermetic sealing of the core space. The absence of a shaft passing through the core assembly allows for the Passage of cooling oil inside the rotor. The sleeve also transmits torque between the endshafts, which are driven at 24,000 R P M. by a gear mounted on one of the endshafts.

However, the practice of welding the endshafts to the sleeve has proved problematic. The welding techniques necessary to meet the physical demands of the generator applications are relatively complex. Furthermore, welding also introduces distortion of critical match machined components in the assembly, which renders repair of the assembly impracticable.

It is therefore apparent that there exists a need in the art for a rotor assembly in which a cylindrical containment sleeve may be simple and effectively secured to a pair of endshafts, while retaining the torque-transmitting abilities of known arrangements.

SUMMARY OF THE INVENTION

It is therefore, an object of the present invention to provide a rotor assembly in which a cylindrical containment sleeve may be simply and effectively secured to a pair of endshafts, while retaining sufficient torque-transmitting properties.

It is another object of the invention to provide, in a dynamoelectric device, a rotor assembly including endshaft structure for providing a core space capable of receiving a core and winding assembly, and a metallic sleeve shrunk-fit onto the endshaft structure, for transmitting torque to at least a portion of the endshaft structure during operation of the dynamoelectric device.

It is yet another object of the present invention to provide a method of assembling a rotor for use in a dynamoelectric device. The method may include providing a pair of generally discoidal endshafts having respective peripheral edge surfaces defining a predetermined endshaft diameter, providing an electromagentic core and winding assembly, securing the electromagnetic core and winding assembly between the endshafts, providing a metallic sleeve having an inner diameter slightly less than the predetermined endshaft diameter, and shrink fitting the sleeve onto the peripheral edge surfaces of the endshafts. In a preferred embodiment, the electromagnetic core and winding assembly may be secured between the endshafts with bolts.

Other objects and advantages of the present invention will be apparent upon reference to the accompanying description when taken in conjunction with the following drawings.

DESCRIPTION OF THE PREFERRED EMBODIMENT

Figure 1:
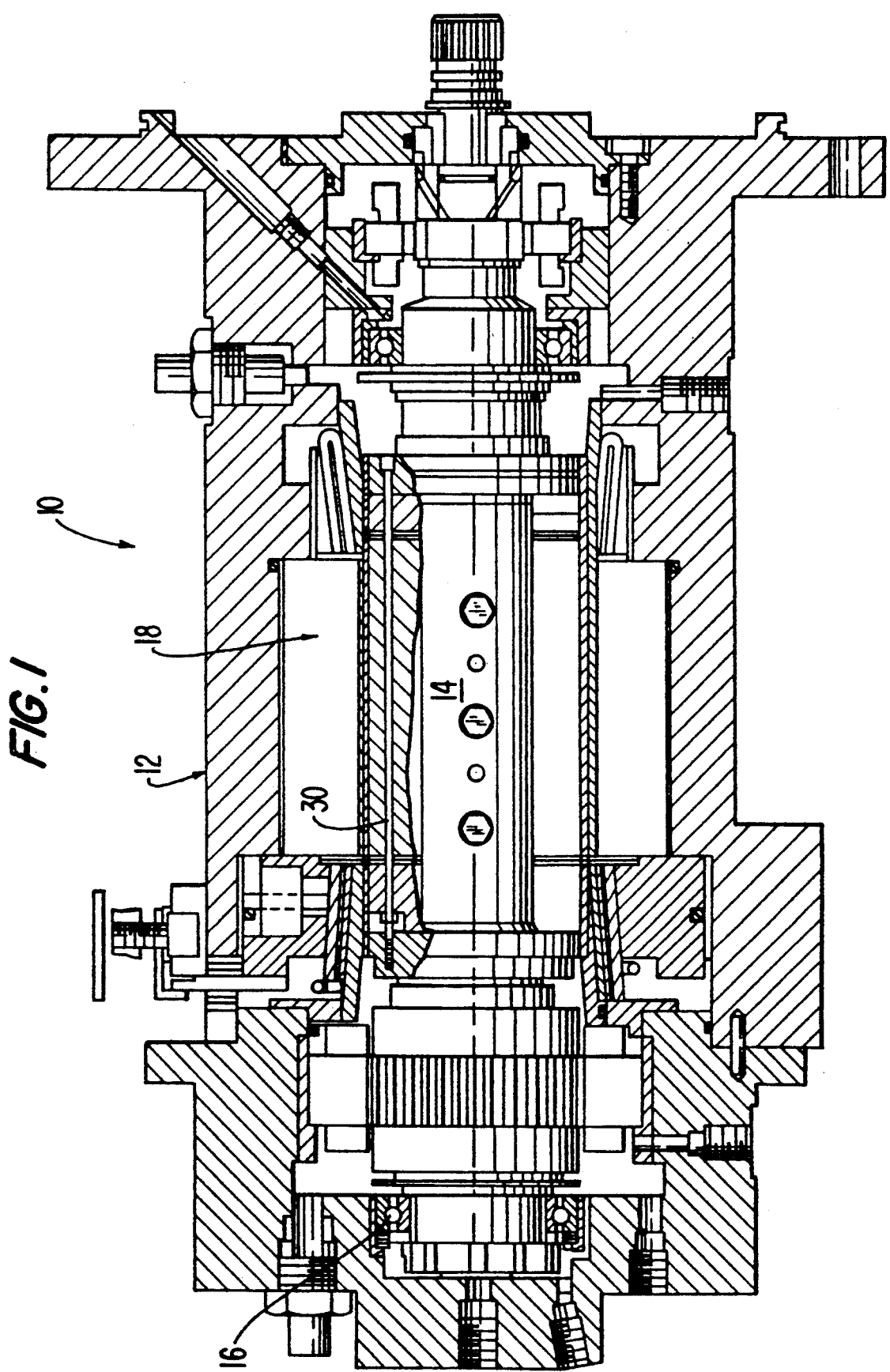
FIG. 1 illustrates a sectional view of an electric machine in accordance with the invention.
Figure 2:
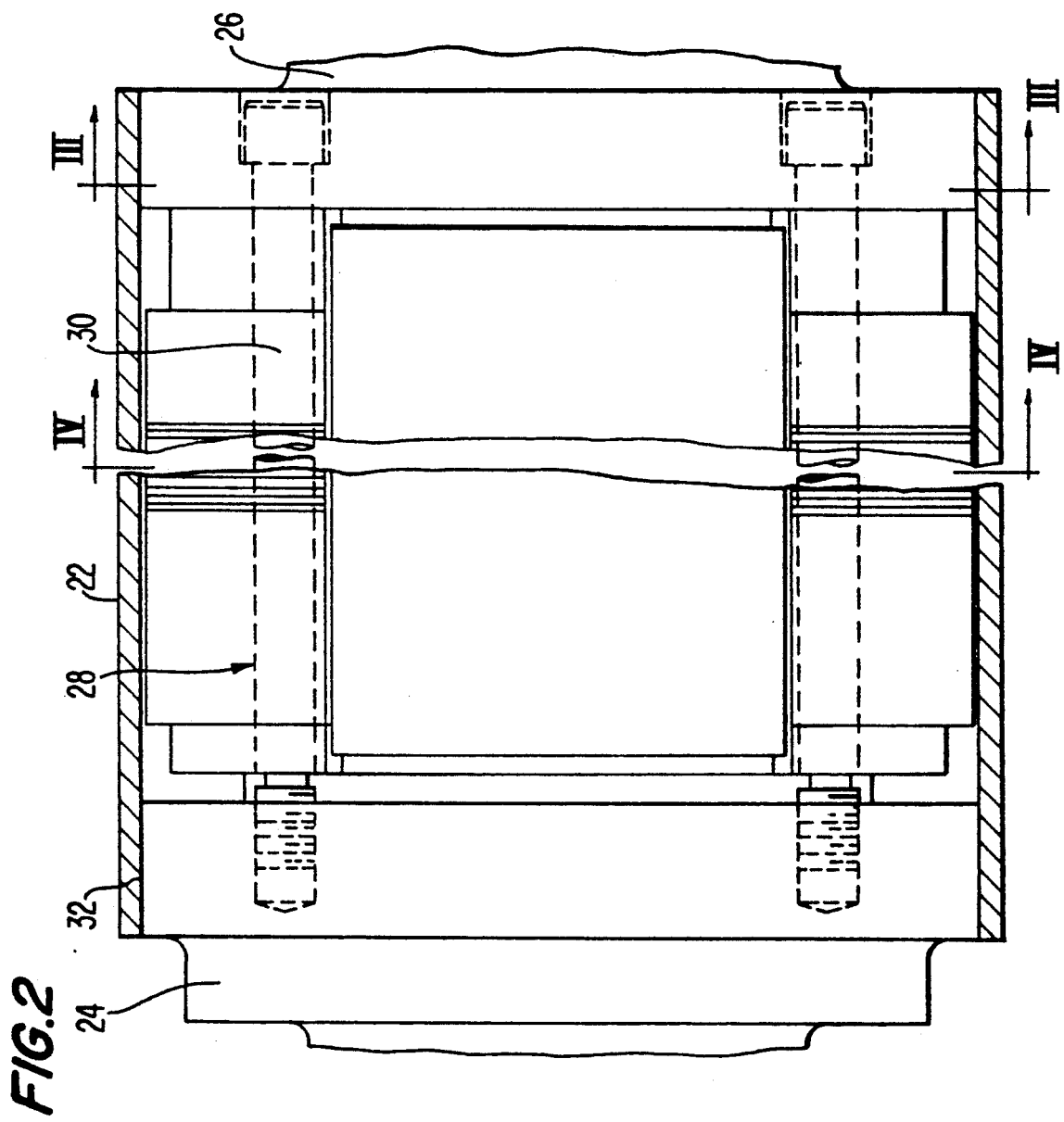
FIG. 2 illustrates an enlarged view of the rotor assembly of FIG. 1.

Reference is now made to FIG. 1, which illustrates a generator 10 embodying the principles of the present invention. Generator 10 includes a housing 12 in which a rotor 14 is mounted for rotation on a pair of bearing assemblies 16. A stator 18 is mounted within the housing 12 at a position relative to the rotor 14 such that an air gap not illustrated is maintained between the rotor 14 and the stator 18. FIG. 2 illustrates an enlarged view of the rotor assembly.

Figure 3:
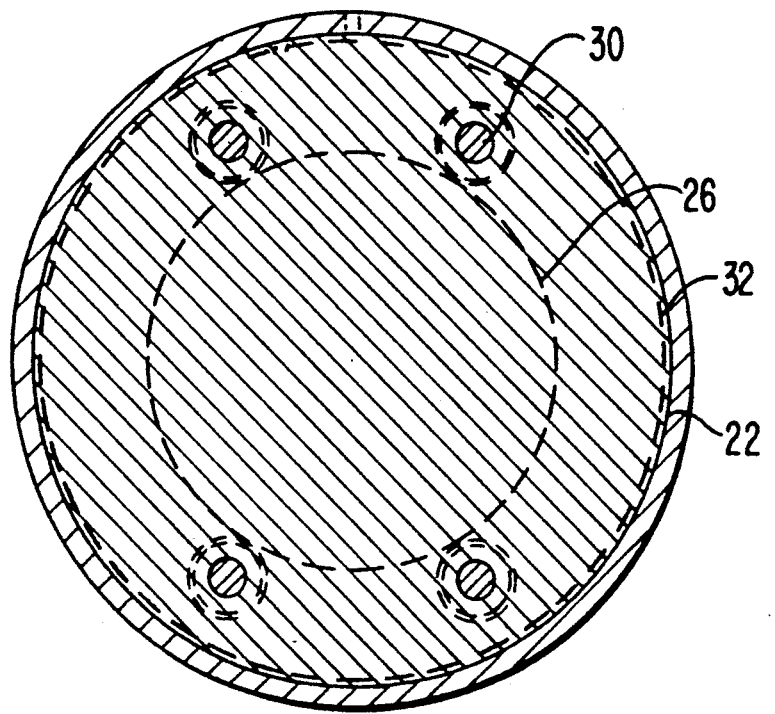
FIG. 3 illustrates a sectional view of FIG. 2 taken along section line III—III.

The rotor 14 includes a cylindrical metallic sleeve 22 secured at one end thereof to a generally discoidal endshaft 24, and at the other end to a similar endshaft 26. The sleeve 22 surrounds and contains an electromagnetic core and winding assembly 28, which is secured to the endshafts 24, 26 by a plurality of bolts 30, as shown in detail in FIGS. 2 through 4.

Assembly of the rotor 14 is as follows. First, the core assembly 28 is secured to the endshaft 24 and the endshaft 26 by the axial bolts 30 passing through the core assembly 28. The axial bolts 30 are used to hold the assembly 28 together only during assembly prior to sleeve 22 shrink-fit. These bolts may remain in the assembly once it is completed, but do not contribute significantly to torque transmission due to the tight interference fit between the sleeve 22 and the endshafts 24, 26. In fact, the present invention contemplates possible removal of the bolts 30 following assembly.

As can be seen in FIG. 2, each of the endshafts 24 and 26 includes an outer cylindrical surface 32, which defines the diameter of the respective endshafts. Next, the metallic sleeve 22, which has a "cold" diameter that is slightly less than the diameters of the endshafts 24, is heated to a sufficient temperature to cause it to expand to a dimension that allows the sleeve to be brought to a position such that the inner cylindrical surface 33 at its opposite ends surround the surface 32 of each of the endshafts 24, 26. Applicants have found that fabricating the sleeve from a material such as a Nickel, Chromium and Iron alloy (ICONEL 718) provides the sleeve with the requisite properties for practicing the invention, although it is contemplated that other suitable materials may also be employed.

In a preferred embodiment, the cylindrical metallic sleeve 22 is heated to a temperature between 900°-1,000° F., although because simple thermal expansion of the sleeve 22 is desired, no particular range of temperature is required. Subsequent to the performance of the above described steps, the sleeve 22 member is allowed to cool to ambient temperature, during which period it shrinks to its previous size. This shrinkage provides a sufficiently tight press fit on both the shaft flanges and the core, such that torque transmission between the components is ensured at all operating temperatures and speeds and so that endshafts 24, 26 are held together to thereby allow bold 30 removal. The metallic sleeve 22 need only be heated enough to slide over the endshafts 24, 26 and should not be heated to its melting point.

Figure 4:
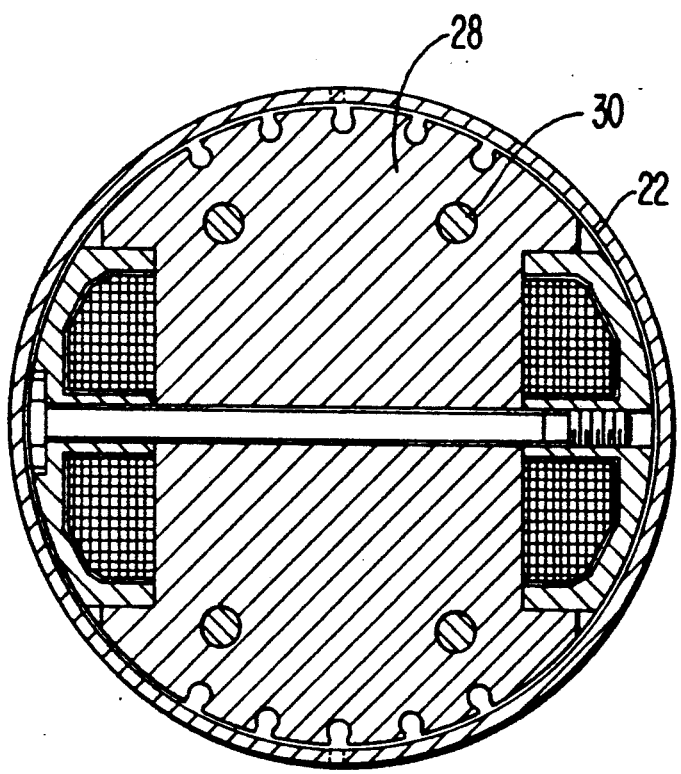
FIG. 4 illustrates a sectional view of FIG. 2 taken along section line IV—IV.

FIG. 4 illustrates a sectional view taken along section line IV—IV of FIG. 2 of two poles 40 which are contained in the core assembly 28 by a pair of wedges 42. The wedges 42 have an outer arcuate surface 43 which contacts an inner cylindrical surface 33 of the sleeve 22. A pair of arcuate sections 45 of the core assembly 28 contact the inner cylindrical surface 33 between the wedges 42. A plurality of channels 51 extend axially in the electromagnetic core and face the inner cylindrical surface 33 o the sleeve 22. A fastener 44 extends diametrically through the electromagnetic core to hold the wedges 42 in place. Windings 46 are contained by each wedge 42 associated with a pole 40 between an inner curved surface 47 and a flat surface 49 of the core assembly 28. Electromagnetic material extends completely across a diameter of the core assembly 28 between the arcuate sections 45.

It can therefore be seen that the present invention provides a sleeve/endshaft interface that eliminates the problems encountered in previously known securing techniques, while being able to transmit torque during high RPM operation of the generator in its high-stress environment.

Although the present invention has been described with reference to a specific embodiment, those of skill in the art will recognize that changes may be made thereto without departing from the scope and spirit of the invention as set forth in the appended claims.

We claim as our invention:

1. A rotor assembly in a dynamoelectric machine comprising:
    first and second endshafts which are axially spaced apart by a metallic sleeve having an inner cylindrical surface which is shrunk fit over an outer cylindrical surface of the first and second endshafts to provide an interference fit between the inner and outer cylindrical surfaces;
    an electromagnetic core and winding assembly disposed axially between the first and second endshafts having an outer arcuate surface which contacts the inner cylindrical surface of the sleeve to provide an interference fit between the outer arcuate surface of the core and winding assembly and the inner cylindrical surface of the sleeve with the core having electromagnetic material extending completely across a diameter of the core between arcuate sections of the core which contact the sleeve and a pair of diametrically opposed wedges with each wedge having an outer arcuate surface contacting the inner cylindrical surface of the sleeve; and a fastener extending diametrically through the electromagnetic core to hold the wedges in place.

2. A rotor assembly in accordance with claim 1, wherein the arcuate sections are disposed between the wedges.

3. A rotor assembly in accordance with claim 2 wherein the electromagnetic core and winding assembly further comprises:
    electrical windings disposed between an inner curved surface of the wedges and a flat surface of the core.

4. A rotor assembly in accordance with claim 1 further comprising:
    a plurality of fasteners extending axially between and connecting the first and second endshafts.

5. A rotor assembly in accordance with claim 2 further comprising:
    a plurality of fasteners extending axially between and connecting the first and second endshafts.

6. A rotor assembly in accordance with claim 3 further comprising:
    a plurality of fasteners extending axially between and connecting the first and second endshafts.

7. A rotor assembly in accordance with claim 1 further comprising:
    a plurality of channels extending axially through the core which face the inner cylindrical surface of the sleeve.

8. A rotor assembly in accordance with claim 2 further comprising:
    a plurality of channels extending axially through the core which face the inner cylindrical surface of the sleeve.

9. A rotor assembly in accordance with claim 3 further comprising:
    a plurality of channels extending axially through the core which face the inner cylindrical surface of the sleeve.

10. A rotor assembly in accordance with claim 4 further comprising:
    a plurality of channels extending axially through the core which face the inner cylindrical surface of the sleeve.

11. A rotor assembly in accordance with claim 5 further comprising:
    a plurality of channels extending axially through the core which face the inner cylindrical surface of the sleeve.

12. A rotor assembly in accordance with claim 6 further comprising:
    a plurality of channels extending axially through the core which face the inner cylindrical surface of the sleeve.

13. A rotor assembly in accordance with claim 1 further comprising:
    a plurality of channels extending axially through the core which face the inner cylindrical surface of the sleeve.

14. A rotor assembly in accordance with claim 7 further comprising:
    a plurality of channels extending axially through the core which face the inner cylindrical surface of the sleeve.

* * * * *